Patented June 1, 1937

2,082,238

UNITED STATES PATENT OFFICE 2,082,238

PROCESS FOR MANUFACTURING ACETYL CELLULOSE OF IMPROVED CLARITY

Henri L. Barthélemy and Edward E. Huffman, Rome, Ga., assignors to Tubize Chatillon Corporation, New York, N. Y., a corporation of Delaware No Drawing. Application March 6, 1935, Serial No. 9,591

5 Claims. (Cl. 260—101)

This invention relates to the production of cellulose acetate, and contemplates a method of manufacturing cellulose acetate that will form initially and permanently clear solutions.

For many industrial purposes, clear plastics are essential. For example, those employed as cementing layers in the manufacture of laminated or "safety" glass sheets should be initially and permanently transparent. Many cellulose acetate cements heretofore employed in "safety" glass manufacture and for other purposes have suffered from the presence of an initial haze or from the formation of such haze upon aging.

When cellulose which has been purified and bleached is dried by ordinary methods, at relatively elevated temperatures until the moisture content is less than about 2 percent, and the dried cellulose is subsequently digested and acetylated in solutions containing a catalyst and a high concentration of acetic anhydride, the resulting product is more or less cloudy or hazy in character, the cloudiness tending to increase upon aging so that eventually an opaque jell is formed. This jell is substantially insoluble in acetic acid, acetic anhydride, and other commonly employed solvents for cellulose acetate such as acetone and cyclohexanone. Because of its opacity and insoluble character this jell has little commercial value. Its presence in even small amount in cellulose acetate precludes the use of such cellulose acetate where transparency of the product is essential.

As a result of our investigations, we have discovered a method whereby the aforementioned difficulties may be avoided, and an initially and permanently haze-free cellulose acetate may be produced. In accordance with our method, bleached and purified cellulose is carefully dried until it contains about 3 percent moisture, care being taken to see that the residual moisture content is uniform throughout. During the drying operation, the temperature of the cellulose should be kept below 90° C. If the cellulose is cut following bleaching, high speed cutters and similar apparatus which might generate considerable frictional heat within the cellulose should be avoided.

The dried cellulose is then digested and acetylated in a mixture of acetic acid and acetic anhydride in the presence of a catalyst such as sulphuric acid. Acetylation may be conducted in a single or in multiple stages. The amount of acetic anhydride employed should be substantially in excess of the amount theoretically required to produce a predetermined degree of acetylation. Preferably the amount of acetic anhydride employed is at least 2.6 times the weight of the cellulose treated. Acetic acid is used in amount sufficient to ensure a ratio of acetic acid to unconsumed acetic anhydride after acetylation of at least 8, and preferably between 8 and 14.

The following is an example of our process conducted in a single stage:

Example I

Purified, bleached and washed cotton linters containing residual moisture from the washing operation are dried carefully in a current of air at a temperature of about 80° C. until a uniformly distributed moisture content of about 3% is obtained. 162 parts by weight of the dried cellulose are then softened in glacial acetic acid and acetylated in a mixture of glacial acetic acid and acetic anhydride to which has been added a small amount of sulphuric acid catalyst. For 162 parts by weight of cellulose 1488 parts of glacial acetic acid and 430 parts of acetic anhydride are employed. The consumption of reagents is as follows:

162 parts of cellulose form 288 parts of cellulose triacetate, consuming 306 parts of acetic anhydride and forming 180 parts of acetic acid. The residual acetic anhydride is equal to (430 minus 306) or 124 parts. The original acetic acid is 1488 parts or 12 times the amount of residual acetic anhydride.

The cellulose triacetate formed by this process is clear when formed and remains so upon standing.

Example II

We prefer to form haze-free cellulose acetate in a process having a series of acetylation stages similar to those described in United States Patent No. 1,880,067, but employing different concentrations of reagents as follows:

*Drying.*—Cotton linters which have been purified and bleached in the conventional manner and contain about 10% of residual moisture are carefully dried in a current of warm air having a temperature of about 75° C., care being taken to obtain a uniform elimination of moisture and to ensure that no portion of the cotton is dried below a residual moisture content of 2%. When the cotton has attained a residual moisture content of 6 to 2% it is withdrawn from the dryer and softened.

*Softening.*—110 kilograms of cotton linters dried in accordance with the above procedure are charged into a water jacketed acetylator of conventional design. From a head tank 95 liters of glacial acetic acid are withdrawn, vaporized and introduced into the mass of cotton in the acetylator. The cotton is continuously agitated during the addition of the softening agent. The temperature of the mass is brought to 18° C. by circulating water having a temperature of 16° C. through the jacket of the acetylator. The softened mass is then acetylated in stages as follows:

*First acetylation.*—175 liters of a mixture of acetic acid containing 7 to 12% acetic anhydride and 204 ccs. of 66° Baumé sulphuric acid is added to the softened mass and agitated therewith for about one hour and a half. With the cooling water at 16° C. the temperature of the mass rises to a maximum of 23° C., chemical equilibrium being attained when about 2% of acetic anhydride calculated as acetic acid is combined.

*Second acetylation.*—175 liters of a mixture of acetic acid containing 7 to 12% acetic anhydride and 367 ccs. of 66° Baumé sulphuric acid are introduced into the acetylator after the termination of the first acetylation and the contents of the acetylator are agitated for two hours and a half, at the end of which time equilibrium is again attained with from 2 to 5% of acetic anhydride calculated as acetic acid combined. A maximum temperature of 24° C. is observed when the temperature of cooling water is 16° C.

*Third acetylation.*—Is conducted after the manner of the first and second but 250 liters of a mixture of acetic acid containing 7 to 12% acetic anhydride and 1210 ccs. of 66° Baumé sulphuric acid is employed. The time of treatment is three hours, characterized by a constant temperature of 24° C. when the water in the jacket has a temperature of 16° C. Equilibrium is attained at the end of three hours, and the cellulose acetate formed is a clear, optically homogeneous mass of syrupy consistency containing 10 to 15% of combined acetic acid.

*Fourth acetylation.*—Is accomplished by the addition of a bath of 115 liters of a mixture of acetic acid and 83–85% of acetic anhydride to which 7 liters of a 10% solution of sodium acetate in glacial acetic acid have been added. The function of the sodium acetate is to inhibit the catalytic effect of the sulphuric acid already present in the acetylator. An hour after this bath has been added the temperature of the jacket water is raised to about 35° C. for 30 minutes in order to start the reaction. At the end of the second hour the jacket water temperature is dropped to 16° C. At the end of 3½ hours the temperature of the mass is reduced from about 35 to about 25° C., and the fifth acetylation is begun.

*Fifth acetylation.*—Is conducted with 140 liters of a mixture of acetic acid and 83–85% of acetic anhydride in about 2 hours, jacket water temperature being raised to about 38° C. The mass attains a temperature of about 45° C. The jacket water should be kept warm to prevent too rapid cooling of the mass when the reaction has been completed. The cellulose acetate is now completed and will be found to contain between 45 and 60% of combined acetic acid. The resulting solution is clear, and less viscous than at the end of the third stage. It will remain clear even after it has stood for several weeks.

Following the fifth acetylation, the product may be saponified, precipitated and processed in the conventional manner.

It has been found that the higher the ratio of acetic acid to residual acetic anhydride remaining after the cellulose acetate is formed the less tendency there is for haze or fog to develop upon standing. When the ratio is as high as 14, there is no tendency for haze to develop, but such a ratio requires large amounts of acetic acid, adding to the cost of reagents and slowing down the rate of acetylation. In most acetylation operations the optimum ratio will probably be somewhere between 8 and 14. The additional acetic acid necessary to produce a haze-free cellulose acetate may be added.

1. At the beginning of acetylation or esterification;
2. In successive increments during acetylation, or
3. At the end of acetylation, just before the reaction is completed.

When acetylation is to be followed by saponification we have found that the additional acetic acid which is usually added to the cellulose acetate solution just prior to saponification to dilute the mass and increase its fluidity may be conveniently added during the acetylation process instead. The same increase in fluidity and decrease in viscosity results, and at the same time the product is rendered haze-free and haze-proof. This modification of our process is particularly desirable when only a portion of the product is saponified, because it permits the withdrawal of a portion of the product for use in the manufacture of plastics, etc., while the rest is used for the manufacture of artificial silk. In other words, a product suitable for either purpose is available, without a marked increase in the consumption of acetic acid.

It should be noted that our process presents advantages in artificial silk manufacture as well as in the preparation of cellulose acetate for use in plastics. The fact that no insoluble jell is formed during aging, permits the product to be stored for long periods, thus increasing the flexibility of the manufacturing operation.

We attribute the haze in cellulose acetate produced according to heretofore customary processes to the presence of unacetylated cellulose anhydride and mono-acetyl-alcohol anhydride of cellulose. Apparently cellulose anhydride, which is originally present in crude cotton, etc., though hydrated in a caustic bleaching process, is again formed during the drying operation if the temperature of the cellulose becomes too high or the moisture content too low. This anhydride is substantially unaffected by the acetylating solutions and tends to produce a part or all of the initial haze. Additional initial haze may be due to the presence of the aforementioned acetyl-alcohol-anhydride formed through the action of excessive concentrations of acetic anhydride in the presence of an inorganic acid catalyst. The increase in haze during aging of the finished cellulose acetate is attributed to this reaction also.

Analyses of jells formed by aging cellulose acetate made with high concentrations of acetic anhydride and relatively low concentrations of acetic acid show a ratio of elements corresponding to the elementary formula $C_8H_{10}O_5$. The combined acetic acid in the jell is about 35%. These and related facts indicate that the jell is mono-acetyl-alcohol-anhydride of cellulose, probably formed through a migration of the acetyl groups combined with the secondary alcohol groups of the cellulose, i. e., the drastic dehydrating power of acetic anhydride in the presence of a catalyst may cause the secondary hydroxyl groups of cellulose to evolve into dehydrated alcoholic form, only the acetyl groups fixed on the primary hydroxyl groups remaining unchanged. It is believed that the secondary hydroxyl groups instead of reacting so—

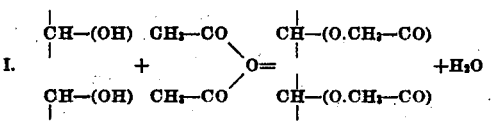

are caused to react as follows because of the dehydrating power of acetic anhydride:

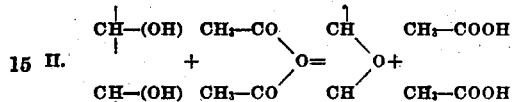

Reaction I is probably favored and reaction II is inhibited by increasing the proportions of glacial acetic acid to acetic anhydride. In any event, an increase of this ratio during acetylation to a point where the acetic acid is at least 8 times the residual acetic anhydride content permits the production of a permanently haze-free cellulose acetate when the drying step has been carefully controlled.

When the acetylation is conducted in a multiplicity of stages as in Example II, the acetic anhydride employed during the first two or three stages is diluted with acetic acid sufficiently to retard any possible dehydrating effect upon cellulose and to allow the acetylating reaction to proceed at a fairly uniform rate. Enough acetic anhydride should be present in the first three baths to accomplish the addition of acetyl groups to the cellulose equal to 10 to 15% by weight of combined acetic acid. We prefer to conduct the acetylation in at least four stages because in this way the reaction may be more conveniently controlled, and excessive and deleterious exothermic reaction heats are avoided.

We claim:

1. Method of making haze-free cellulose acetate which comprises acetylating purified and bleached cellulose which has been dried to a residual moisture content between 6 and 2 percent at a temperature not in excess of 90° C. with a mixture of glacial acetic acid, acetic anhydride and an inorganic acid catalyst, the weight of acetic anhydride employed being at least 2.6 times the weight of the cellulose, and the glacial acetic acid employed being between 8 and 14 times the weight of the residual acetic anhydride after acetylation.

2. Method of making haze-free cellulose acetate which comprises drying purified, bleached and washed cellulose at a temperature not in excess of about 90° C. until the residual moisture is from 2 to 6 percent, and acetylating the dried cellulose with glacial acetic acid, acetic anhydride and a catalyst, the weight of acetic anhydride employed being at least 2.6 times the weight of the cellulose, the glacial acetic acid employed being from 8 to 14 times the weight of the residual acetic anhydride after acetylation.

3. Method of making haze-free cellulose acetate which comprises drying purified and bleached cellulose containing residual moisture until the average residual moisture is between 6 and 2 percent, the temperature of the cellulose during drying being not in excess of 90° C., softening said cellulose by the addition thereto of glacial acetic acid, acetylating the softened cellulose in a substantial excess of acetic anhydride in the presence of glacial acetic acid and an inorganic acid catalyst, the amount of glacial acetic acid employed in acetylating being between 8 and 14 times as much as the amount of unconsumed acetic anhydride in the acetylation bath.

4. Method of making initially and substantially permanent haze-free cellulose acetate which comprises drying purified cellulose containing residual moisture until the moisture content of the cellulose is between 6 and 2 percent, the temperature of the cellulose during drying being not in excess of 90° C., softening the purified and dried cellulose in glacial acetic acid, and acetylating the cellulose in the presence of a catalyst in a plurality of stages with solutions containing acetic anhydride and glacial acetic acid, the total acetic anhydride employed being substantially in excess of the amount combining with the cellulose and the total glacial acetic acid employed being between 8 and 14 times the weight of the uncombined acetic anhydride.

5. Method according to claim 6 in which the acetylation is accomplished in at least four stages, and in which the first three baths contain acetic anhydride in amount sufficient to add acetyl groups to the cellulose equivalent to from 10 to 15 percent of combined acetic acid per unit weight of the cellulose.

HENRI L. BARTHELEMY.
EDWARD E. HUFFMAN.